United States Patent [19]
Hartlepp

[11] Patent Number: 5,018,928
[45] Date of Patent: May 28, 1991

[54] SORTATION EQUIPMENT

[76] Inventor: Karl Hartlepp, 487 Highway 53 West, R.R. #1, Ancaster, Ontario, Canada, L9G 3K9

[21] Appl. No.: 429,589

[22] Filed: Oct. 31, 1989

[30] Foreign Application Priority Data

Oct. 31, 1988 [CA] Canada .................................. 581736

[51] Int. Cl.⁵ ............................................. B65G 47/46
[52] U.S. Cl. ................................... 414/339; 198/365; 104/290; 105/261.1; 414/337; 414/350; 414/382; 414/384
[58] Field of Search ............... 414/339, 350, 470, 381, 414/382, 383, 384, 386, 387, 337; 104/290, 292; 105/241.1, 241.2, 270, 261.1; 198/365

[56] References Cited

U.S. PATENT DOCUMENTS

| | | | |
|---|---|---|---|
| 3,050,168 | 8/1962 | Kemp | 414/339 X |
| 3,167,192 | 1/1965 | Harrison et al. | 414/384 |
| 3,360,106 | 12/1967 | Harrison et al. | 414/382 X |
| 3,510,014 | 5/1970 | Speaker et al. | 414/384 |
| 3,630,394 | 12/1971 | Kingzett | 414/384 |
| 3,749,025 | 7/1973 | Giraud | 104/290 X |
| 3,845,721 | 11/1974 | Wagner | 104/290 X |
| 3,865,226 | 2/1975 | Scata | 198/365 |
| 3,974,909 | 8/1976 | Johnson | 198/365 |
| 4,063,655 | 12/1977 | Lambert | 414/384 |
| 4,065,007 | 12/1977 | Kurahashi | 414/384 |
| 4,089,404 | 5/1978 | Venzke | 414/384 X |
| 4,174,773 | 11/1979 | Venzke | 198/365 |
| 4,378,062 | 3/1983 | Macrum | 198/365 |
| 4,635,785 | 1/1987 | Prydtz | 198/365 |
| 4,722,430 | 2/1988 | Canziani | 198/365 |
| 4,726,464 | 2/1988 | Canziani | 198/365 |
| 4,856,642 | 8/1989 | Nicholson et al. | 198/365 |
| 4,860,662 | 8/1989 | Matsumoto et al. | 104/290 X |

FOREIGN PATENT DOCUMENTS

| | | | |
|---|---|---|---|
| 54-138273 | 10/1979 | Japan | 198/365 |
| 2197633 | 5/1988 | United Kingdom | 198/365 |

Primary Examiner—Robert J. Spar
Assistant Examiner—Robert S. Katz
Attorney, Agent, or Firm—Rogers & Scott

[57] ABSTRACT

The present invention provides a novel train and track which can be used in an automated, tracked soration system which is capable of sorting and transporting high volumes of goods efficiently and which gives flexible system design, easy set-up, easy servicing with minimum down time, centralized control and a minimum of wiring complexity. The train includes "smart" cars and a locomotive for pulling the cars around the track. The trains are loaded with goods to be sorted and given destination addresses for the goods at a loading or master station. Once a train has left the master station, all functions including keeping track of position, regulating speed and dumping cars are to be controlled by a microprocessor placed aboard each locomotive. This "smart" design allows the track to be very simple as it need only provide a path and lower supply for the trains to run on and the train can wait at the loading station until it has a full or partial load to deliver. Power feed lines are provided associated with the track to power the locomotive, and passive destination or slave stations are positioned about the track to receive sorted goods. Each dumping car includes a tray and a discharge mechanism. The trays are pivotable about an axis longitudinal to the cars and allows dumping to the sides of the track. Pivoting of these trays are controlled by the discharge mechanism which are movable from a neutral position to an intermediate position and to an engagement position. The tray pivots to dump when the discharge mechanism contacts a fixed object on the track. The pivoting is prevented when the discharge mechanism is in the neutral position.

11 Claims, 12 Drawing Sheets

SORTATION EQUIPMENT

This invention relates to a tracked sortation system suitable for transporting goods such as parts, mail and packaged materials from a loading station to selected destination stations on a closed loop track. More particularly it relates to track and a cargo carrying train which autonomously delivers the goods to the destination stations on the track.

The invention will be explained with reference to a preferred embodiment designed to transport small loads such as mail (including packages) weighing from several ounces to several pounds. However, it will become apparent that the invention can be executed on a larger scale for heavier loads.

There are a number of ways of sorting including pigeon-hole sorting systems, conveyor belt sortation systems, and tracked sortation systems.

Pigeon-hole sorting describes a system of manual sorting into a number of destination pigeon-holes or bins. This system is efficient for small volumes of goods but it does not fulfill a transport function and is very labour intensive.

An improvement over pigeon-hole sorting is a conveyor belt system which simply transports goods past stations where the required goods are removed. These systems are used to sort and transport large volumes of goods but they are also labour intensive and suffer from the disadvantage that they can not be made to turn corners unless the goods are transferred from one conveyor to another at the corners. In addition they can be very complicated to set up or rearrange and they must be shut off for most maintenance tasks.

The problems associated with pigeon-hole sorting and conveyor belt sortation has led to the development of tracked systems. Typically a closed loop track carries cars propelled by a continuous belt or chain drive. The cars are equipped with open trays which can be loaded from overhead chutes, and subsequently tilted to unload their cargoes into bins which are located around the track. These cars are termed "dumb" because they do not initiate any sorting actions, but rather respond to stimuli from the track and stations. For example, car speed is controlled by a trackside motor which circulates the belt or chain drive, and car dumping is controlled by trackside dumping mechanisms. Such systems are designed for longer term installations which sort and transport larger volumes of goods.

Although prior closed loop systems have a good deal of design flexibility, the complexity of their track, drive and tilting mechanisms, makes it a major undertaking to set them up or rearrange their sorting layout. They must be shut down for nearly all maintenance tasks.

A further consideration in conventional closed loop systems is energy conservation. Such systems tend to be inefficient for two reasons. Firstly and foremost, a typical system runs continuously picking up only when goods are presented at the chute or loading station. Consequently a complete system has to be operated to deliver one item so that energy is being used to drive the cars regardless of payload. For these and other reasons the system is energy inefficient.

The present invention provides a novel train and track which can be used in an automated, tracked sortation system which is capable of sorting and transporting high volumes of goods efficiently and which gives flexible sYstem design, easy set-up, easy servicing with minimum down time, centralized control and a minimum of wiring complexity.

To achieve the desired results, the train includes "smart" cars and a locomotive for pulling the cars around the track. The trains are loaded with goods to be sorted and given destination addresses for the goods at a loading or master station. Once a train has left the master station, all functions including keeping track of position, regulating speed and dumping cars are to be controlled by a microprocessor placed aboard each locomotive. This "smart" design allows the track to be very simple as it need only provide a path and lower supply for the trains to run on and the train can wait at the loading station until it has a full or partial load to deliver. Power feed lines are provided associated with the track to power the locomotive, and passive destination or slave stations are positioned about the track to receive sorted goods. Consequently there is no need for a drive chain, drive motor and track side dumping control mechanisms with the attendant wiring. The present simple track design allows new track configurations to be made up by simply adding track switches, added sections and slave stations. Sorting capacity can be varied by adding or subtracting cars to a train in accordance with the capacity of the master station, or by changing the number of trains operated on a track. Finally, it is possible to perform many maintenance tasks by removing individual cars or trains from the track, leaving the rest of the system intact and operating.

The following detailed explanation of a preferred embodiment of the invention will be better understood with reference to the drawings, in which.

Figure 1:
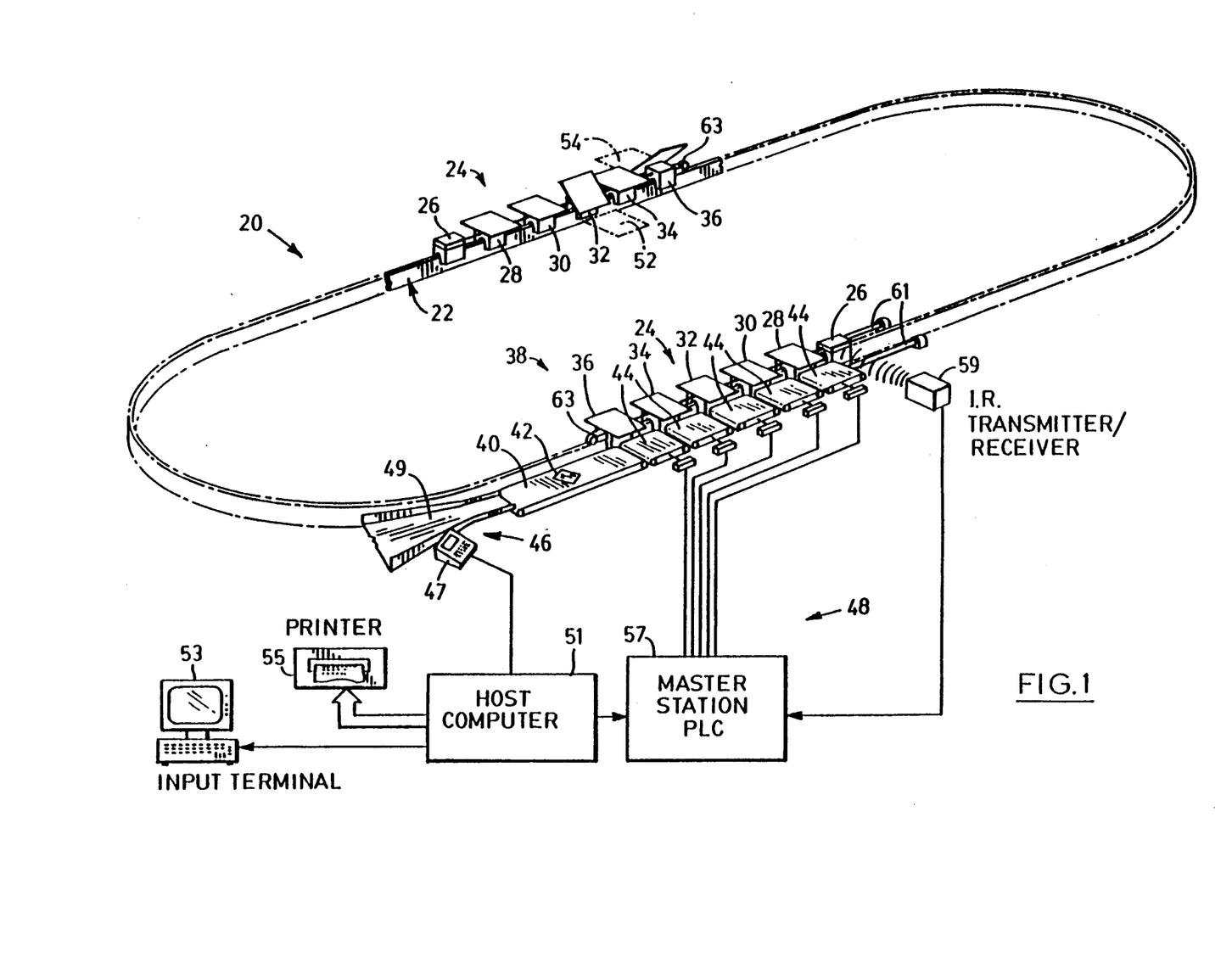
FIG. 1 is a diagrammatic perspective view of a typical track set up to carry a train in accordance with a preferred embodiment of the invention, and including a master and several slave stations.

Reference is made firstly to FIG. 1 which illustrates an exemplary track sortation system 20 consisting essentially of a closed loop track 22 on which rides a train 24 (shown in two positions on the track) consisting essentially of a locomotive 26 and trailing cars 28, 30, 32, 34, and 36. As will be explained, power is provided from the track forming the loop 22 to the locomotive 26 to drive the train around the loop.

This invention provides the train and track and is for use in a sortation system of a type having a master and slave stations. Such a system will be described in general terms for completeness but the control system is the subject of another invention. The present train and track can be used in many forms within the scope of the invention and the inclusion of elements of a system to control the train is for the purposes of enhancing the description of the invention.

The train originates from a master or loading station 38 which typically includes a loading conveyor 40 for delivering packages or loads 42 to positions where the packages are moved by loaders 44 onto the cars simultaneously. As the package moves along the conveyor it passes a station 46 linked to a control system 48 which also operates the loaders. 44. Information about the addresses of the packages is entered into a keyboard 47 in the order in which the packages leave a chute 49. The packages then travel via the conveyor 40 onto the loaders 44 which pass the packages along and place them one to a loader. The information about the packages is fed to a host computer 51 which has been programmed using an input terminal 53 which has a printer 55 for providing hard copies. Data from the host computer is used by a programmable logic circuit (PLC) 57 to activate the loaders 44 and to provide a signal for transmission by an infrared transmitter/receiver 59 which is directed towards the locomotive 26. The loaders 44 place the packages on the trays of the train and the information about the addresses for the individual packages is transmitted from the infrared transmitter/receiver 59 to a similar unit on the locomotive 26. Under instructions from the PLC, the train begins to move using a combination of a linear induction motor (LIM) and a control mechanism 61 which will be explained with reference to FIGS. 13 and 14, and which at this point is used to accelerate the train to provide mechanical assistance for the linear induction motor.

The information provided to the locomotive by the transmitter/receiver 59 is used to unload the packages at the destinations such as slave stations 52, 54. As seen in FIG. 1, these stations are receiving mail from respective cars 32 and 36 to opposite sides of the track. There can of course be many more slave stations around the loop and only two are shown for the purposes of simplicity of drawing. Also, the stations may be separated by significant distances rather than being separated by a distance less than the length of the train as illustrated in FIG. 1.

It is significant to note that because the train operates using the linear induction motor, it is capable of travelling around the track by picking up power from suitable contacts (which will be explained) and the dumping of the packages is done entirely by the train without any further information being provided from the master station. The train controls the dumping using fixed equipment at the slave stations.

The position of the train on the track is determined by an onboard logic circuit using signals from a friction driven encoder 63 which runs on the track.

After the train has run autonomously around the track and delivered all of the packages, the train will return to the master station where it is met by the mechanism 61 and retarded until it stops, the mechanism is then activated to bring the train back into a position where it is located ready to receive further packages. Of course if there is no mail to fill the train, then the train can simply stand at the master station and wait until the mail arrives.

Figure 2:
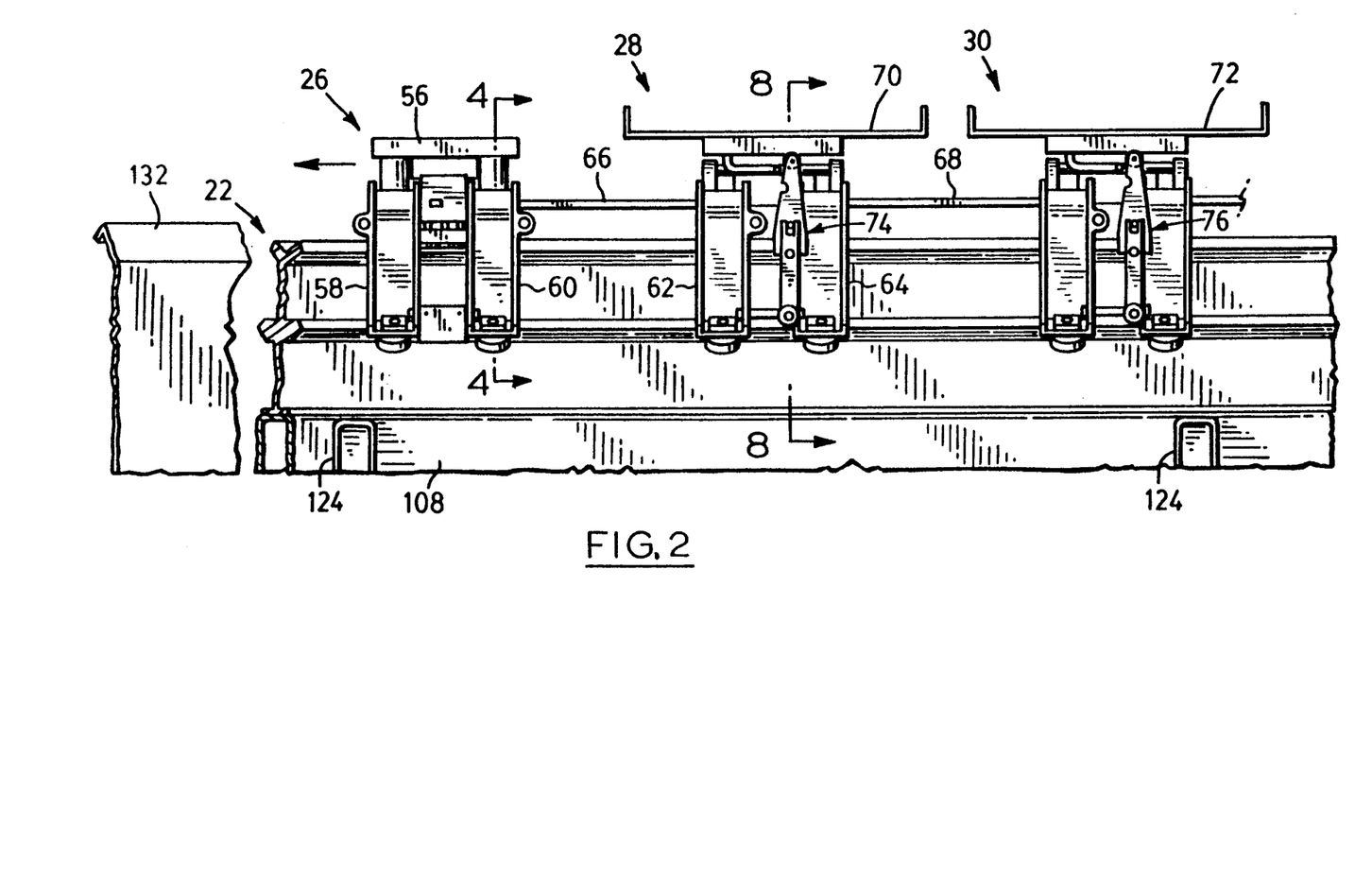
FIG. 2 is a side view with portions removed for clarity of part of the train and track and including a locomotive and two associated cars sitting on a section of the track.

Some details of the train are shown in FIG. 2. The locomotive 28 includes a logic unit 56 having a receiver for receiving the transmission from the master station and a microprocessor for acting on the information from the transmitter 50 (FIG. 1). The unit 56 sits on a pair of similar sub-assemblies 58, 60 which form the basis of all of the cars as well as the locomotive. As seen in car 30, although two similar sub-assemblies 62, 64 are arranged to face one another differently, they are nevertheless the same sub-assemblies as 60 and 58 respectively. As will be explained, the locomotive travels on the track 22 and pulls through a draw bar 66, the car 30. Similarly a draw bar 68 pulls car 32 and so on.

Each of the cars carries a tray, for instance the car 30 carries a tray 70 and the car 32 carries a tray 72. These are associated with respective discharge mechanisms 74, 76 which will be explained in more detail later. For the moment it is sufficient to understand that these mechanisms will normally be in a neutral position where they will not engage tilt activators at the slave stations and they can be actuated by the locomotive into an engagement position where they will meet the slave stations. As a result of the engagement between the slave station and a mechanism, the corresponding tray will be tilted to one side as required to unload the package from the tray at the corresponding slave station. Details of these structures will be described with reference to subsequent drawings.

The locomotive will now be described in detail with reference particularly to FIGS. 3 and 4.

Figure 3:
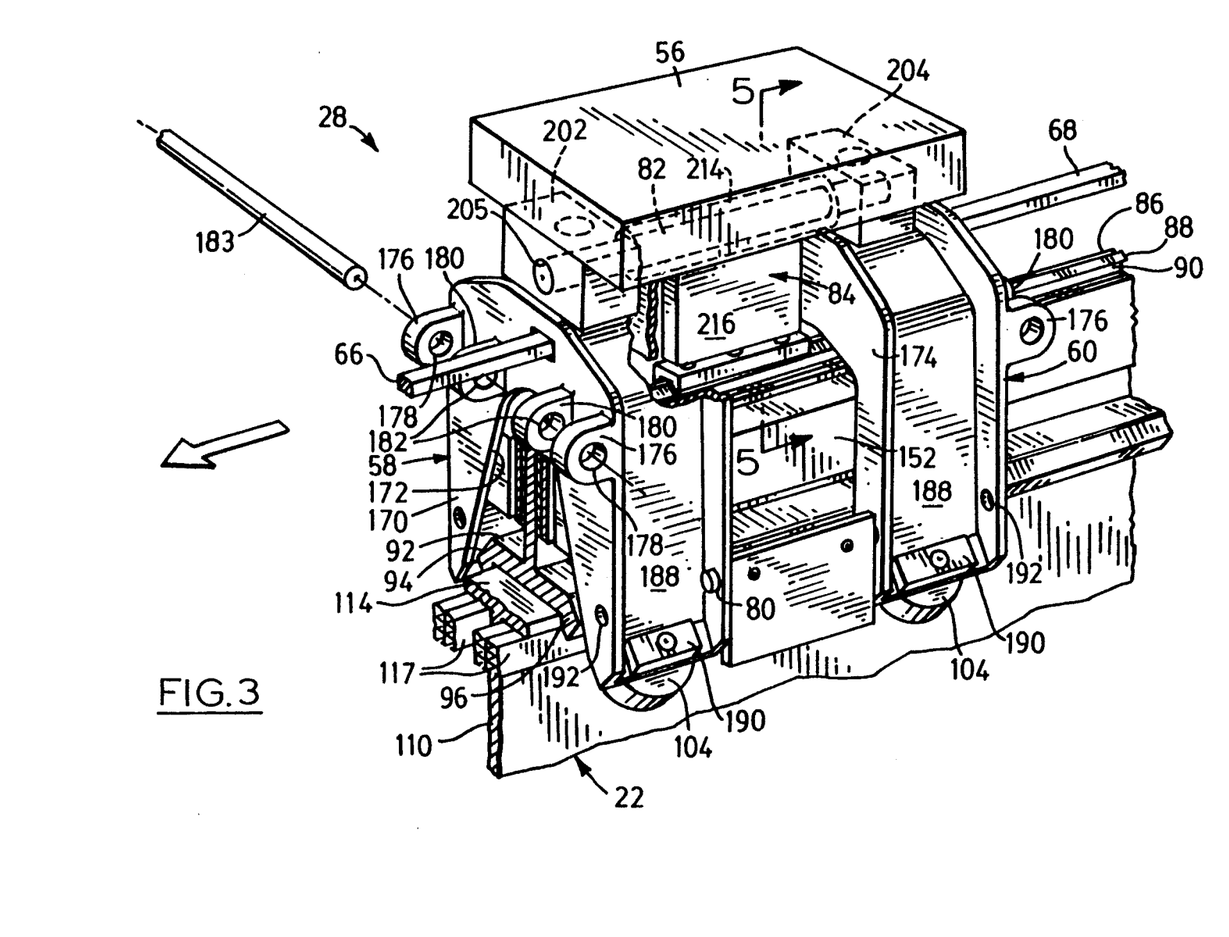
FIG. 3 is a perspective view to a larger scale than FIG. 2 with portions broken away to illustrate the locomotive in more detail and its arrangement on the track.

As mentioned previously, the locomotive includes a pair of sub-assemblies 58, 60 which are attached to one another by a pair of tie-rod assemblies 80 (one of which is shown in FIG. 3) and at their upper extremities, by a bar 82 which also provides support for a brake assembly 84 and for the logic unit 56. While the wiring is not shown, it will be clear that connections are provided between the unit 56 and the individual cars to activate the discharge of mail as will be described. Each of the sub-assemblies 58, 60 is generally of an inverted U-shape and extends over and to both sides of the track 22. The cars ride on the extruded aluminum track with a positive location because the track is in the form generally of an I-section terminating at its upper extremities in outwardly and upwardly inclined arms 86, 88 which depend from a central web 90. This web extends downwardly from the arms to a transverse portion 92 terminating in respective downwardly and outwardly extending legs 94, 96. The arms 86, 88 terminate in bearing surfaces receiving rollers 98, 100 to absorb downward loading, and the legs 94, 96 terminate in surfaces providing for engagement of a further pair of rollers 102, 104.

All of the sub-assemblies have corresponding rollers which are given reference numerals only as required in the description.

The arrangement is such that the bearing surfaces react to loading to locate the car against forces in all directions so that the car remains upright and travels along the track freely in this preferred orientation.

The track is supported from a steel base structure 106 having a main structural member 108 carrying an I-section support 110. This support has a base 112 attached to the top of the structural member 108 and a top piece 114 which fits in a recess provided on the underside of the track. Suitable fasteners (not shown) are provided as required and the result is that there is a cavity under the track for containing a series of electrical carriers attached to the undersides of the top piece 114. There are four carriers 116 of conventional form. Each has a cover 117 of insulating plastic material and contains a copper conductor 118 fixed inside the cover for running engagement by a spring biased pick-up arm 119 and these arms are supported in pairs by respective L-shaped brackets 120, 121 attached, as seen in FIG. 3, to the tie-rod assemblies 78, 80 and which extend downwardly and under the track.

The track support structure 106 can have any preferred form and in this example includes transverse elements 122, 124 (see also FIG. 7) extending outwardly from the structural member 108 to support vertically extending side elements 126, 128. Also, attached outwardly of these elements are protective shields 130, 132 provided primarily for reasons of safety.

The side elements 126, 128 include respective top portions angled inwardly to form horizontal shelves 134, 136 towards the one another to support respective channels 138, 140. These channels form T-shaped slots to receive guides such as guide 142 which is used to discharge the mail from a car as will be described. At the moment rt is sufficient to understand that one of these is provided at each of the slave stations for this purpose and forms of the channels 138, 140 make it possible to locate the guide 142 at any location along the length of the track.

Figure 4:
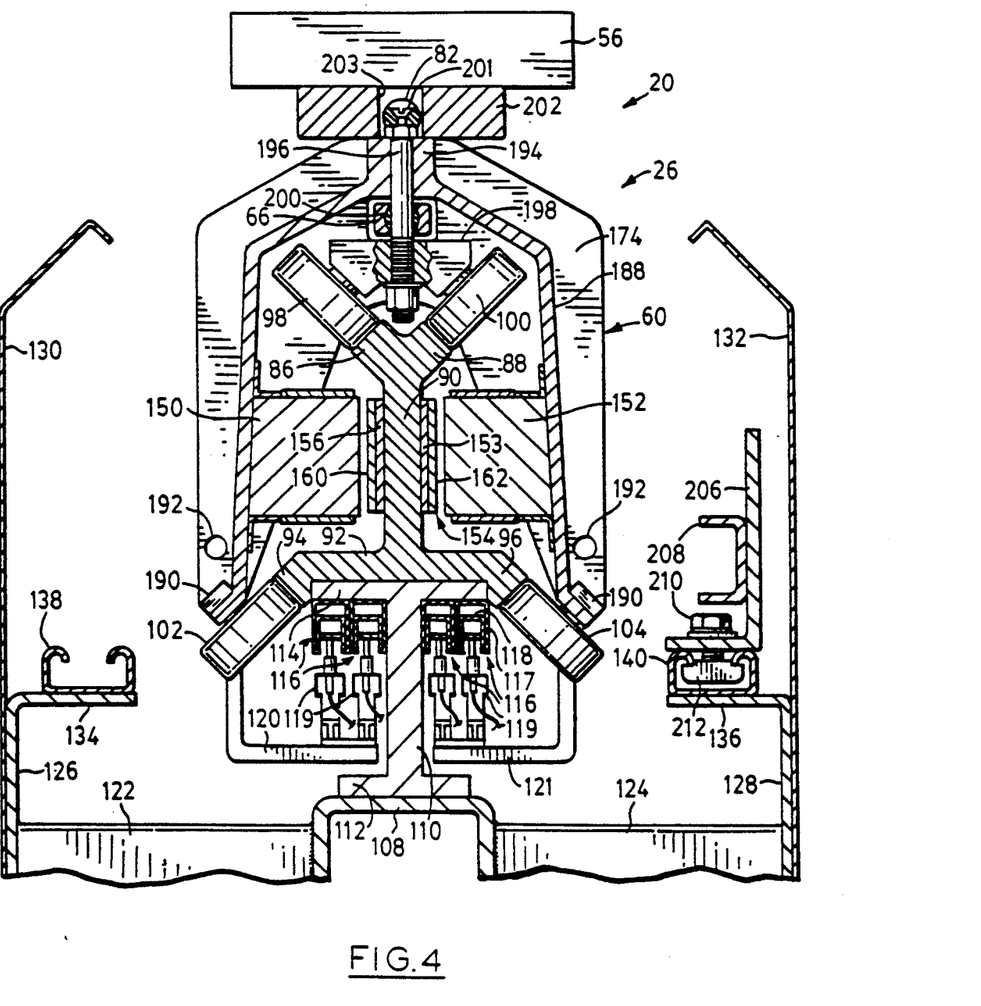
FIG. 4 is a sectional view on line 4—4 of FIG. 2 to a larger scale and including portions of the track associated with a receiving or slave station.

FIG. 4 also illustrates the relationship between onboard portions 150, 152 of a linear induction motor and an induction rail designated generally by the numeral 154. The induction rail consists of a pair of continuous steel reaction strips 156, 158 attached to opposite sides of the web 90 of the track and covered by similar strips of aluminum 160, 162. The parts 150, 152 are spaced from the induction rail 154 to ensure clearance during operation of the train. Once the induction motor is actuated, the train will move linearly along the track under the influence of the induction motor.

Returning now to the structure of the locomotive, it will be seen that the sub-assemblies 58, 60 are similar and, in the arrangement used in the locomotive, a larger flange 170 extends across the exposed face of the sub-assembly 58 to define a simple archway 172 providing clearance to pass over the track. This flange provides great strength and the structure is further reinforced by a shorter and smaller flange 174 seen facing the viewer in FIG. 3 on the sub-assembly 60. This flange differs from the larger flange in that it is proportioned to provide clearance for mounting the linear induction motor parts 150, 152 (FIG. 4) which extend between the sub-assemblies. Suitable attachments will of course be provided but these are excluded for simplicity of drawing.

As seen in FIG. 3, the flange 170 has dependent from it a pair of outer bosses 176 defining a pair of aligned openings 178 and, between these bosses a pair of inner bosses 180, which define similar aligned openings 182. It will be appreciated that similar bosses are provided on corresponding surfaces of the sub-assembly 60. The bosses 176 and 180 seen in FIG. 3 are used to receive a round engagement bar 183 which is used to engage the mechanism 61 (FIG. 1) to decelerate, locate and accelerate the train.

The flanges 170 and 174 project outwardly from a web 188 which extends about the sub-assembly terminating its ends in mountings 190 for the rollers 102 and 104. Also, the flanges are provided with aligned side openings 192, some of which can be seen, to receive the respective tie rod assemblies 78, 80.

Each of the sub-assemblies 58, 60 also includes a boss 194 seen in FIG. 4 on sub-assembly 60) and positioned between the flanges 170, 174 and on the top of the web 188. Each of these bosses provides support for a vertical bolt 196 which passes downwardly through the boss and suspends a mounting block 198 from which are suspended the rollers 98, 100. The bolt 196 also serves to receive the draw bar 66 which sits about a spherical element 200 on the bolt so that the draw bar can move angularly within limits in the manner of a universal joint. Also, the head of the bolt is drilled and tapped to receive a screw 201 which holds the bar 82, thereby connecting the sub-assemblies to one another at the top of these assemblies. Access for energizing the screw 201 is provided by a vertical opening 203 in a saddle 202 which is one of two saddles 202, 204 (FIG. 3) mounted on the tops of the respective sub-assemblies to provide attachment and support for the logic unit 56. Each of the saddles has a horizontal opening 205 (FIG. 3) receiving the saddle so that on tightening screw 201, the saddles are locked in place in the assembly.

Figure 5:
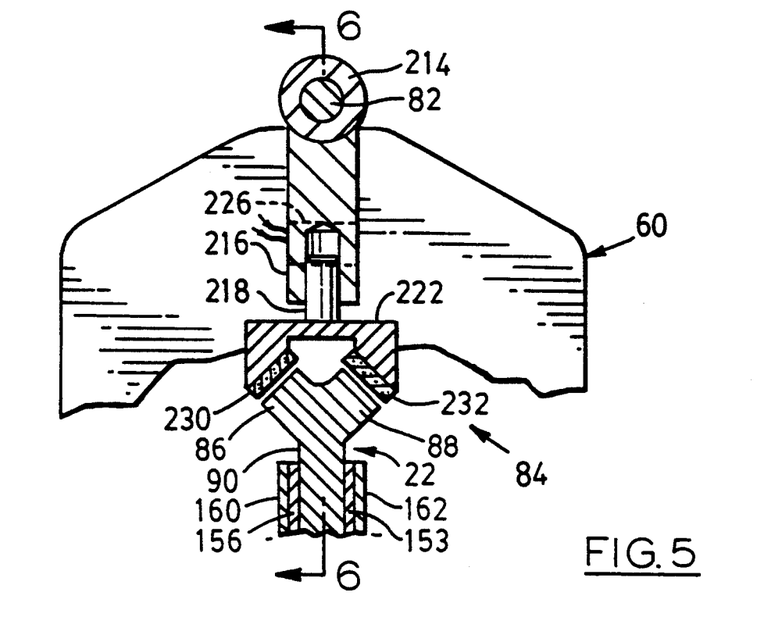
FIG. 5 is a sectional view on line 5—5 of FIG. 3 and illustrating an emergency brake mechanism.
Figure 6:
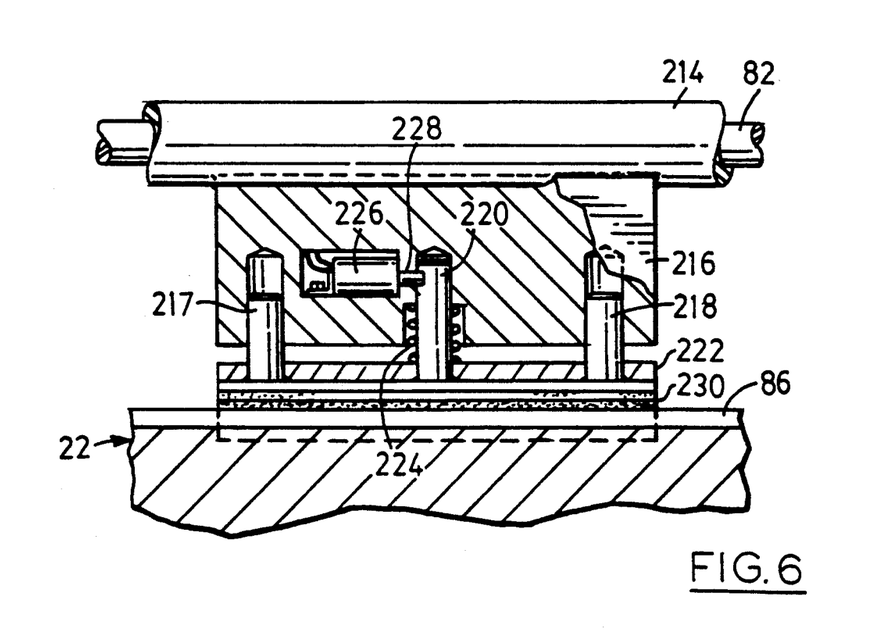
FIG. 6 is a sectional view on line 6—6 of FIG. 5.

The locomotive is completed by the inclusion of the emergency brake 84 seen in FIGS. 3, 4, and 5. As seen in FIG. 5, the emergency brake 84 includes a supporting sleeve 214 which is a sliding fit on the round bar 82 and which is attached at its underside to a main part 216. This part is drilled to receive three upright posts 217, 218, and 220 which extend in parallel from a brake shoe 222. The center post 220 is longer than the others and carries a compression spring 224 biasing the brake shoe 222 into engagement with the running surfaces on the arms 86, 88 of the track. The spring is normally under compression and is released in emergency conditions when power is disconnected from a solenoid 226 to withdraw a locking pin 228 from a detent in the post 220. Once this pin is withdrawn, the compression spring 224 forces the shoe 222 downwardly and brake pads 230, 232 come into contact with the track to stop the locomotive and hence the train. This action is of course a "one shot" activity for emergency stops and will require resetting before the equipment can be used again.

Electrical connections (which are not shown for the sake of simplicity) are provided from the unit 56. This completes the description of the locomotive and the general shape of the track.

It will now be understood that the locomotive is a unit capable of picking up power from the track and, under the influence of the logic unit 56 it can be programmed to control its movement along the track. Power is also provided for operating solenoids on the cars as will be described. This is all under the influence of a microprocessor in unit 56 which receives its information before the train sets out from the master station via transmitter 50.

Before the train is made to travel around the track, stations must be set up in locations where mail is to be dumped. Each of the stations will include some form of receiver for the mail, more importantly, it must have one of the guides 142 (FIG. 4) set up in the right location. Returning to this figure, it will be seen that the guide, in cross section, consists of an L-shaped bracket 206 which supports a channel element 208 extending generally along the direction of the track. The L-shaped bracket 206 is attached to the channel 140 by a bolt 210 fitting into a T-shaped nut 212. The structure of the guide 142 is such that it can be positioned anywhere along the length of the channel 140 and on either side of the track because there is a corresponding channel 138 on the other side.

Returning momentarily to FIG. 2, the car 30, which is typical of the cars, is attached by the drawbar 66 to the locomotive 28 and drawbar 68 attaches it to the next car 32. These drawbars are attached in the same fashion as drawbar 66 is attached to the locomotive and the cars 30, 32 etc. differ in general in overall arrangement from the locomotive in that the sub-assembly 62 corresponds to the tracking sub-assembly 60 of the locomotive but leads to other sub-assembly of the car. The arrangement of the sub-assemblies in the locomotive makes it possible to attach the linear induction motor and in the cars to attach the discharge mechanisms. Of course any suitable alternative prime mover can be used such as a DC motor driving by frictional engagement with the track.

Figure 7:
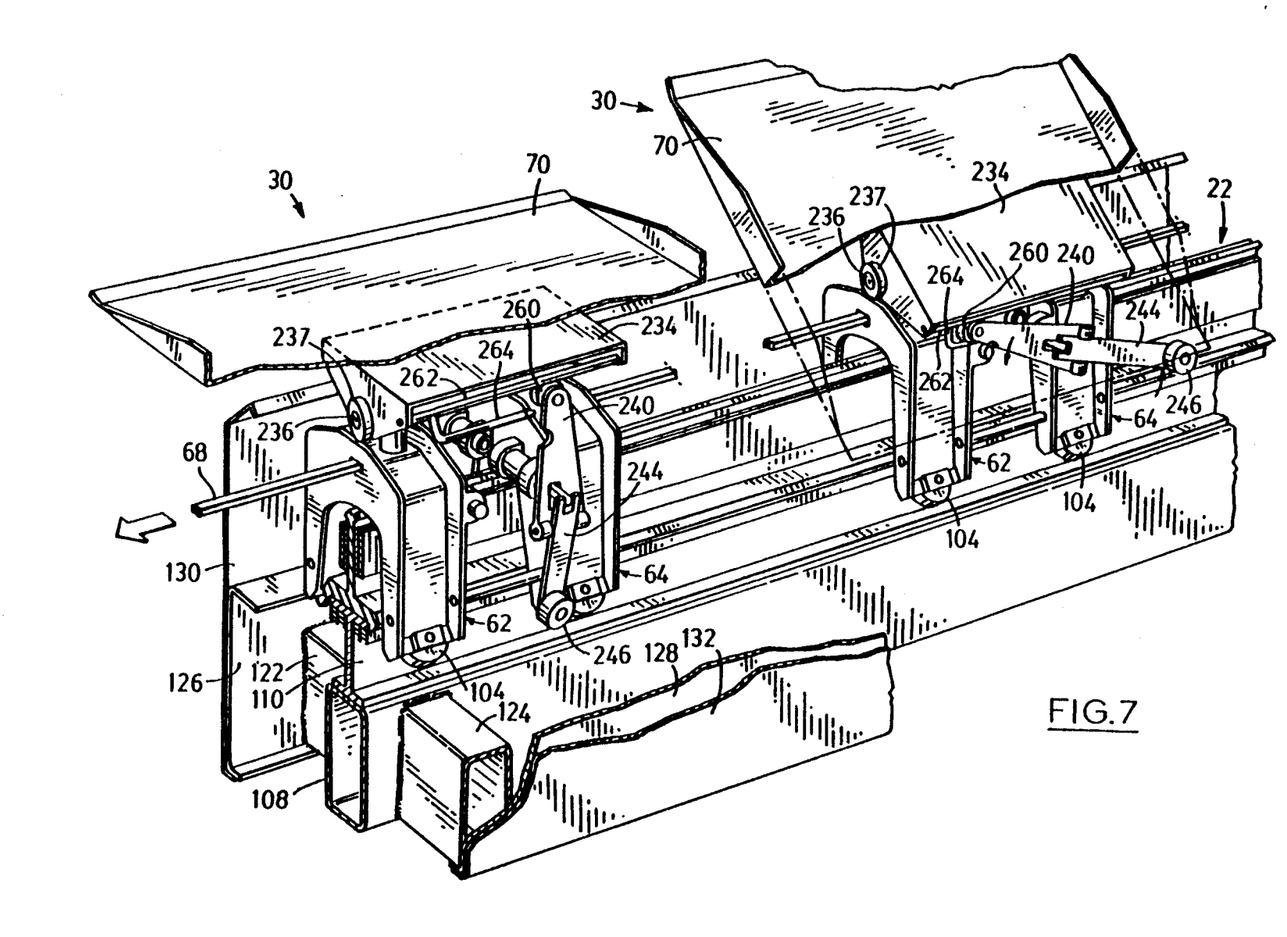
FIG. 7 is a view similar to FIG. 3 and illustrating two of the cars with a first car shown in the normal travelling position and the second car shown in a tilt position at a slave station.

Reference is next made to FIG. 7 which illustrates car 30 in two positions. In the leading position, the mechanism 74 is in a neutral position where it will not cooperate with the slave stations, and in the trailing position the mechanism is in a position as if it were cooperating with such a station to tilt the tray 70.

Figures 8, 10:
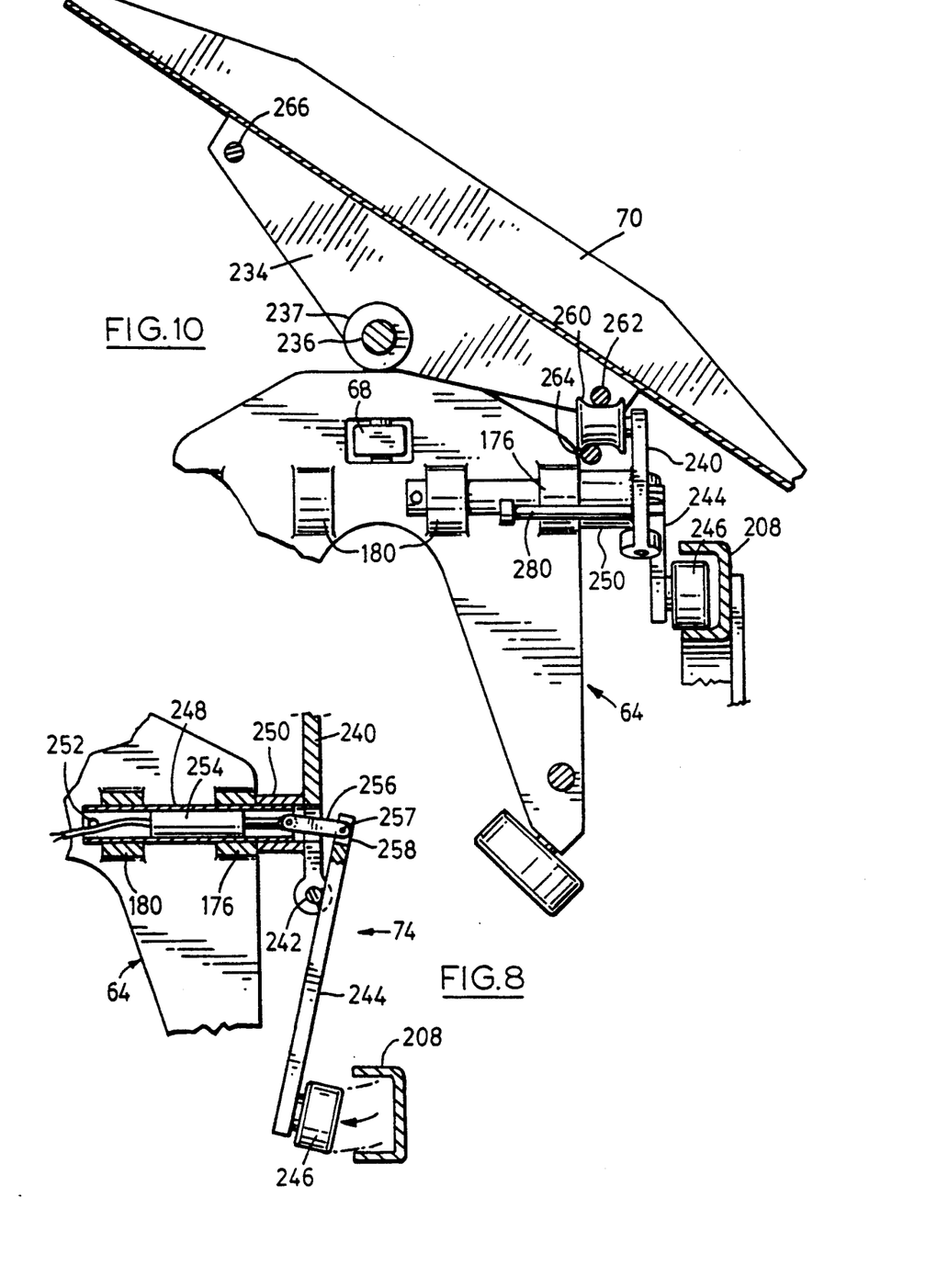
FIG. 8 is a part sectional view on line 8—8 of FIG. 2 and illustrating the unloading mechanism in a neutral position.
FIG. 10 (drawn adjacent FIG. 8) is also a view similar to FIG. 9 and further illustrating the unloading as the tilting takes place.

As seen in FIGS. 7 and 10, the tray 70 sits on a support 234 which is mounted on a bar 236 attached by bolts to the sub-assemblies 62, 64 in the same manner as described with reference to the bar 82 on the locomotive. The bolts support blocks carrying the upper wheels as described with reference to the locomotive as well as the tie-rod and universal joint similar to that on the locomotive.

The support 234 is rotatably mounted on the bar 236 at a pair of end bearings 237 (one of which is seen) and shaped to permit the tray to swivel about bar 236 to either side of the car for unloading at slave stations. As shown in FIG. 7, in the trailing portion, the car 30 has the tray 70 tilted towards the viewer, and in order to achieve this, the discharge device 74 has been moved towards an engagement position effected by meeting the slave station as will be more fully described with reference to FIG. 10. This contrasts with the position of the device 74 in the leading car which is in a neutral position to avoid engagement with slave stations.

The arrangement of the discharge mechanism in the neutral position is best seen in FIG. 8. It will be seen that the mechanism consists of an upper or tilt arm 240 attached at a horizontal pin 242 to a follower 244 having at its lower extremity a roller 246 proportioned to engage in the channel element 208 at slave stations. The pin 242 forms a connection between the follower 244 and arm 240 such that they will move in unison about the axis of a tubular shaft 248 attached to a boss 250 on the tilt arm 240. The shaft passes through openings in respective outer and inner bosses 176, 180 formed on the sub-assembly 64 in similar fashion to bosses previously described with reference to the locomotive and sub-assembly 58. A small opening 252 is provided at the inner end of the shaft 248 to receive a pin or other fastener to prevent the loss of the shaft from the bosses.

The tilt arm 240 is fixed firmly to the shaft 248 for rotation about the axis of the shaft whereas the follower 244 is fixed firmly by pin 242 to the tilt arm 240. The follower 244 is controlled relative to the pin 242 by an internal solenoid 254 in the shaft 248. The solenoid is fixed in place and is attached by a link 256 and pin 257 to a fork 258 formed in the upper end of the follower 244. The solenoid is shown in this embodiment to be double acting but it can be arranged with a spring to operate in a single direction. As shown in FIG. 8, the solenoid is powered to push the pin 257 outwardly so that the arm tilts about pin 242 to bring the roller 246 into a neutral position where it will not engage with the channel element 208. As long as the solenoid is powered this way, the car will travel around the track without ever engaging a slave station.

Figure 9:
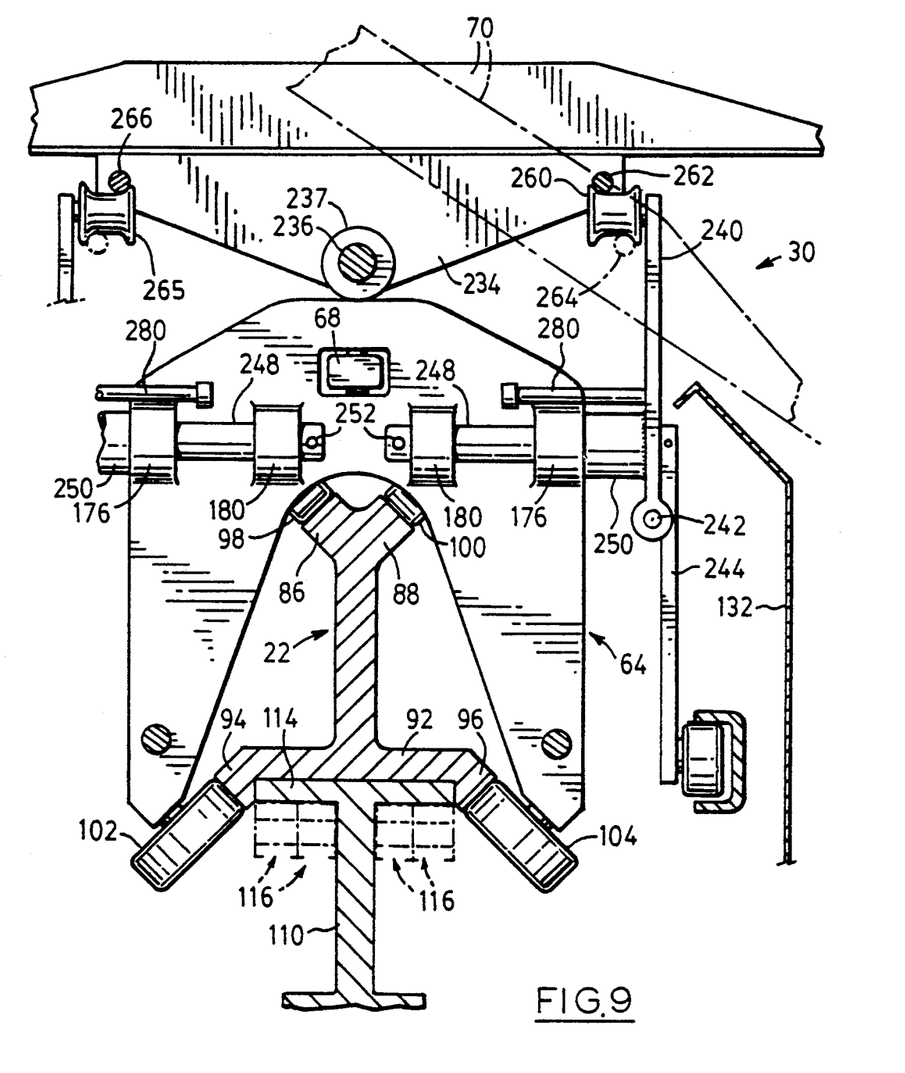
FIG. 9 is a view similar to FIG. 8 but with the section taken slightly in front of line 8—8 and illustrating parts of an unloader mechanism in position ready to tilt the tray for delivering a package from the tray to the slave station.

Once the solenoid is actuated to draw the link 256 inwardly, the follower 244 is rotated to bring the roller 246 into the path of the channel element 208 and into the position shown in FIG. 9. The limit to this rotation of the follower 244 is its engagement at its upper end with the tilt arm 240. The follower 244 and tilt arm are then capable of withstanding impact loading as the follower 244 is driven by its engagement with the channel element 208 as will be described.

Also seen in FIG. 9 in the arrangement at the upper end of the tilt arm 240. A bobbin shaped roller 260 is rotatably attached to extend inwardly from the arm and is shaped for engagement with an upper or round first rod 262 attached and forming part of the support 234 and a secondary round rod 264 which, as can be seen in FIG. 7, is welded to and depends from the fixed rod 262.

Figure 12:
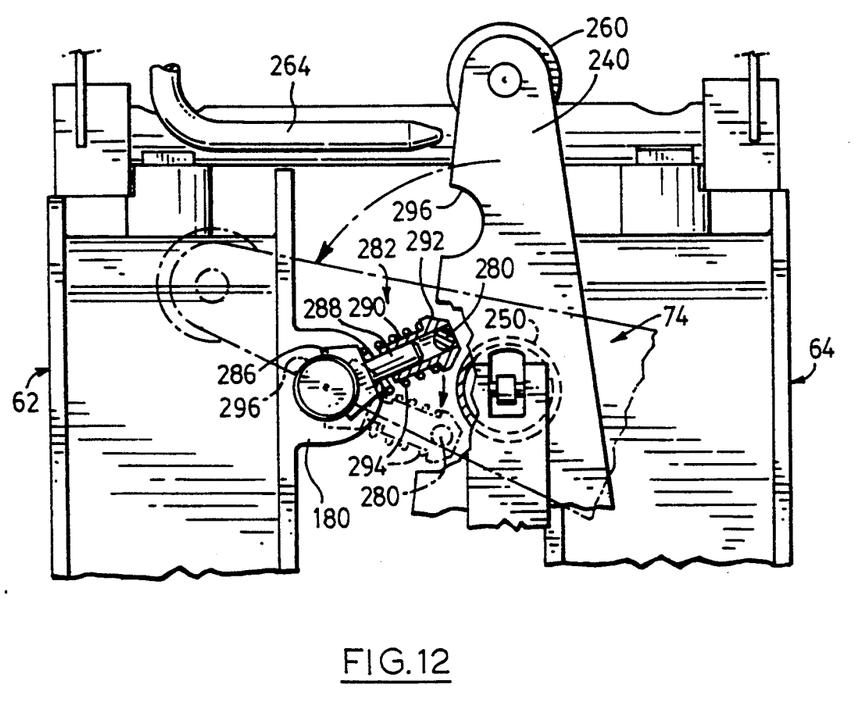
FIG. 12 is a side view illustrating other features of the unloading mechanism.

The view of the discharge mechanism 74 shown in FIG. 9 illustrates a preparatory position where no tilting has yet taken place but the mechanism 74 has engaged the channel element 208 and is about to be affected by a change in elevation of that element as will be described with reference to FIG. 10. However, it should be appreciated that because of the position of the cross-section of FIG. 9, the rod 264 appears to be in engagement with the roller 260. This is not the case as can be seen by a comparison with FIG. 7. Although in FIG. 7 the mechanism 74 is in the neutral position, there is no change in position of the tilt arm 240 between the positions shown in FIGS. 7 and 9. As seen in FIG. 7, the roller 260 sits below and in contact with the upper rod 262 but is spaced horizontally from the rod 264. A second mechanism 74 (part of which can be seen in FIG. 9), includes roller 265 in engagement with a second upper rod 266. Consequently, the contact between the rods 262, 266 and the respective rollers 260 and 265 will resist this tendency and hold the tray in a substantially horizontal position. As will be explained with reference to FIG. 12, an over-center mechanism is provided to maintain the tilt arm 240 in a vertical orientation until it is dislodged by movement caused by engagement with the channel element 208. Consequently, with the mechanism 74 in the neutral position, and its corresponding mechanism on the other side in a similar position, the tray 70 is in a stable horizontal orientation as the car travels around the track.

Consider now movement from the intermediate position shown in FIG. 9 to a tilted position shown in FIG. 10. This movement has been caused by a transition from an initial position 268 shown diagrammatically in FIG. 11 to a tilted position indicated as 270 in the same figure. As the car moves from position 268 to position 270, the roller 246 meets channel 208 which has a ramp 272 between a first part 274 corresponding to the position shown in FIG. 9 and an elevated part 276 corresponding to position shown in FIG. 10. Consequently, because the car is moving from position 268 to position 270, the discharge mechanism moves under the influence of the follower roller 246 in the channel 208 to the position illustrated and as this movement takes place, the roller 260 at the top of the arm 240 moves into engagement between the upper rod 262 and the dependent lower rod 264 so that it is trapped between these rods. Consequently, as it is driven through an arch about the center of the axis of rotation of the tilt arm, it carries the tray downwardly at that side until a position is reached where the arm is as indicated at position 270 in FIG. 11. Due to the arcuate movement of the tray, the rods 262, 264 will move in a horizontal direction along the axis of the roller 262. The positions are chosen so that the movement is as illustrated by a comparison between FIGS. 8 and 9.

The tilting movement shown in FIG. 10 is possible because at the other side of the car, the rod 266 is free to move upwardly away from roller 265 (FIG. 9) due to the fact that the bottom or dependent rod is spaced horizontally from the roller 265 (as illustrated in FIG. 2). Of course when the tray is moved back to its original position, the rod 266 will again come into play when it rests on the roller 265.

Figure 11:
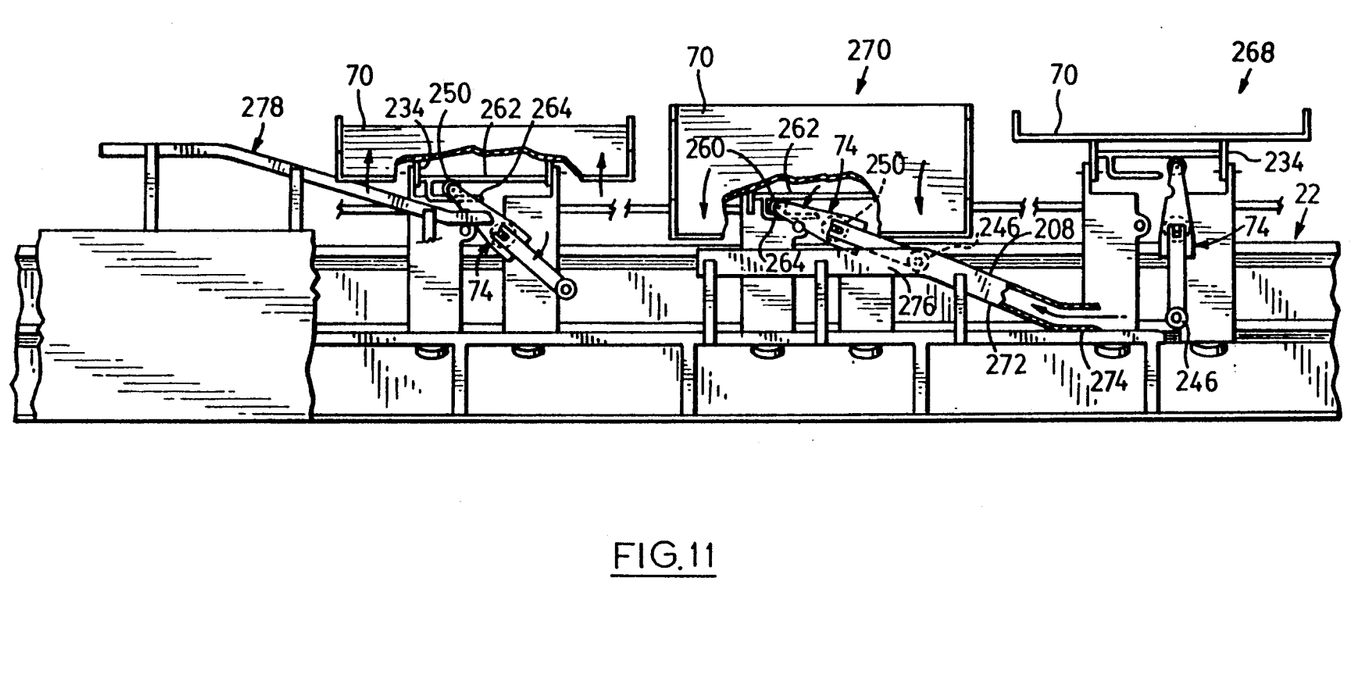
FIG. 11 is a side view showing somewhat diagrammatically, the complete operation of the discharge mechanism as a car passes a slave station.

The tray will remain in the tilted position as long as the channel element contains the roller 246. As seen in FIG. 11, the roller will leave this track and the mechanism 74 must then be moved back to its original position. This is achieved by providing a ramp 278 on which the tray rides to push the tray upwardly back to its original position. In view of the fact that the mechanism 74 is no longer engaged with the channel element 208, the movement will continue until the tray again reaches the horizontal position where it is supported as previously described. This simple expedient allows for movement to take place without the need for complicated mechanisms.

Once the car travels to a point where the mechanism 74 is no longer in engagement with the channel element 208, the tray would be unstable unless the mechanism is biased to remain in that position until effected by the ramp 278 acting on the tray. This is achieved by the use of an over-center mechanism illustrated in FIG. 12. Although not previously mentioned, the arm 240 of the mechanism 74 includes a stiff pin 280 which can also be seen in FIGS. 9 and 10. This pin is shown in FIGS. 9 and 10 to illustrate its position but the over-center mechanism is not included in these drawings for the sake of simplicity.

Returning to FIG. 12, the pin 280 will of course move with the arm 240. The movement is resisted in the solid outline position shown in FIG. 12 by an over-center mechanism 282 which rests on a shaft 284 provided in the bosses 176, 180 on the sub-assembly 62. The mechanism 282 consists of a shoe 286 which is shaped to sit on the shaft and includes a cylindrical projection 288 engaged within a sleeve 290. The sleeve has an enlarged outer end 292 so that a compression spring 294 is contained between the end 292 and the shoe 286. As a result, the sleeve and outer end are biased outwardly into firm engagement with the pin 280. This will retain the mechanism 74 in the position shown in solid outline but the spring 294 can be overcome as the mechanism 74 is forced by the channel element 208 towards the tilted position identified as 270 in FIG. 11. At this point the over-center mechanism will be almost in the position shown in chain dotted outline in FIG. 12, in other words it will be over-center and biasing the mechanism 74 into its most tilted orientation. Once the mechanism 74 leaves the channel element 208, the over-center mechanism will take over and tends to rotate the mechanism 74 into engagement with the shaft 284 where it is located by a recess 296 formed in the side of the arm 240.

It will now be apparent by review of the drawings that the tray is firmly located in a horizontal position while the mechanism 74 is in either the neutral or intermediate positions. The mechanism will move to the engagement position when the channel element 208 meets the roller 246 whereupon the tray is tilted as the car moves from the position 268 to position 270 in FIG. 11. Once the tilting is completed and the car has left the channel element 208, the over-center mechanism maintains stability until the tray meets the ramp 278 and the force resulting from this engagement overcomes the over-center mechanism and returns the mechanism 74 to position 268. It will of course only return to the neutral position once the solenoid 258 (FIG. 8) is operated to complete the cycle. This procedure is followed each time the tray is made to tilt a parcel but is only necessary should the tray be carrying a parcel. In the event that particular tray is not carrying a parcel around the track, the train does not need to actuate it, and it will simply remain in the neutral position.

Figure 13:
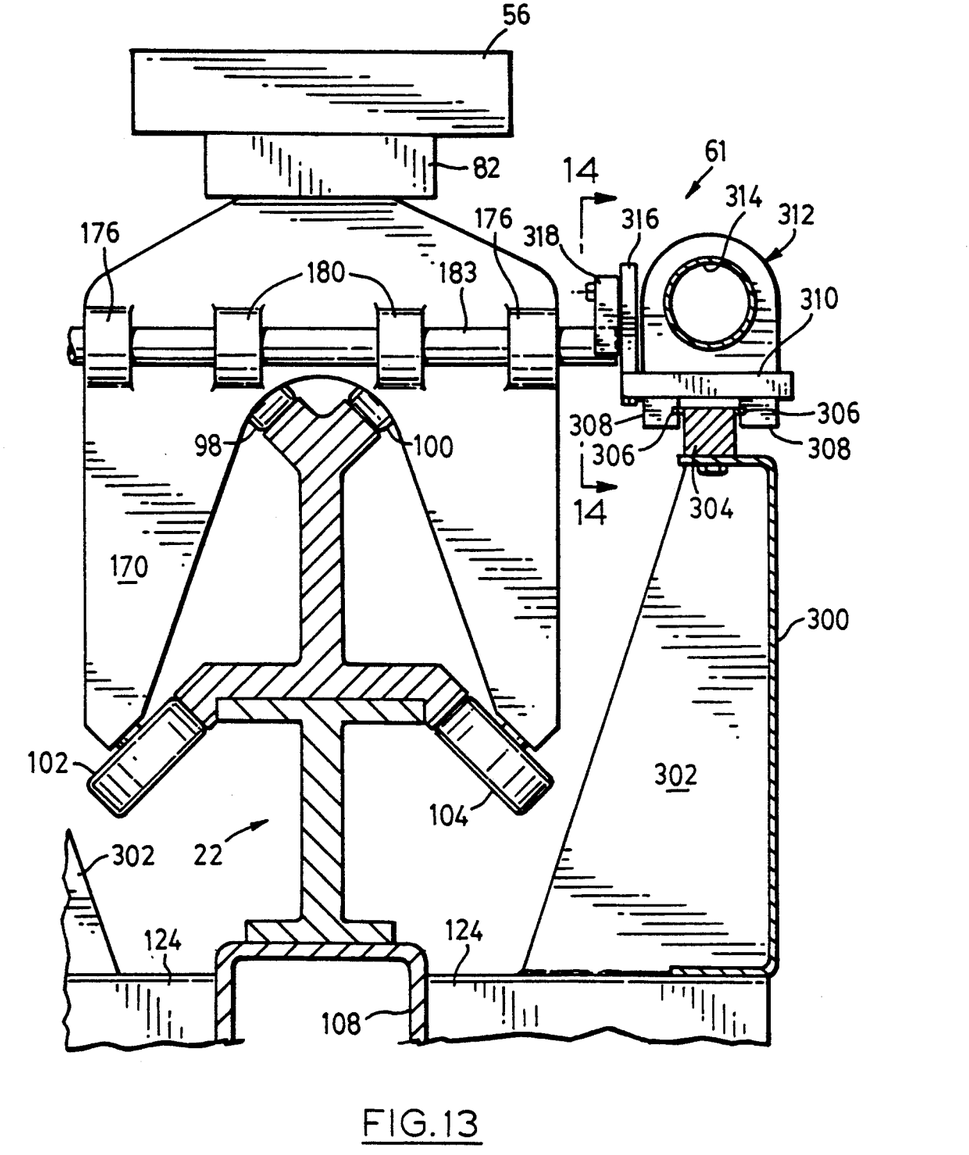
FIG. 13 is a view similar to FIG. 4 and illustrating the relative position of a control mechanism used to decelerate and locate the train at the master station and to accelerate the train from this station.

Reference is next made to FIG. 13 to describe the mechanism 61 used to decelerate, locate and accelerate the train at the master station. It will be appreciated that because the linear induction motor is being used, although the power to the motor can be reversed to slow it down, it is impossible to locate it accurately on the track. In order to do this, the mechanism 61 catches the train as it is coming to a stop, decelerates it, and once it is stopped, the mechanism then moves back to its original position where the train is then properly located in the master station. When the train is about to leave the station, the mechanism 61 accelerates the train to complement the inefficient accelerating forces present in a linear induction motor.

Returning to FIG. 13, it will be seen that the bar 183 which was previously described with reference to FIG. 3, is positioned in the bosses 176, 180 and projects to engage the mechanism which sets on a support structure 300 attached to transverse elements 124 and including reinforcing webs 302, one of which can be seen. The support structure 300 carries one of a pair of track elements 304 having hardened ribs 306 engaged in bearing blocks 308 on the underside of the pedestal 310. The pedestal and bearing blocks form part of a carriage 312 which is free to slide on a thin walled tube 314 made of a non-magnetic material, preferably stainless steel. Inside this tube is a free magnetic piston (not shown) which remains with the carriage relative to the length of the tube. This is the principle of a conventional rodless cylinder and, as is well known in the art, the piston can be made to move by applying compressed air and the carriage will follow the piston although it is not mechanically attached. This type of arrangement has many advantages over more mechanical devices because suddenly applied loads result in less impact due to the magnetic connection and of course the presence of air in the system.

Figure 14:
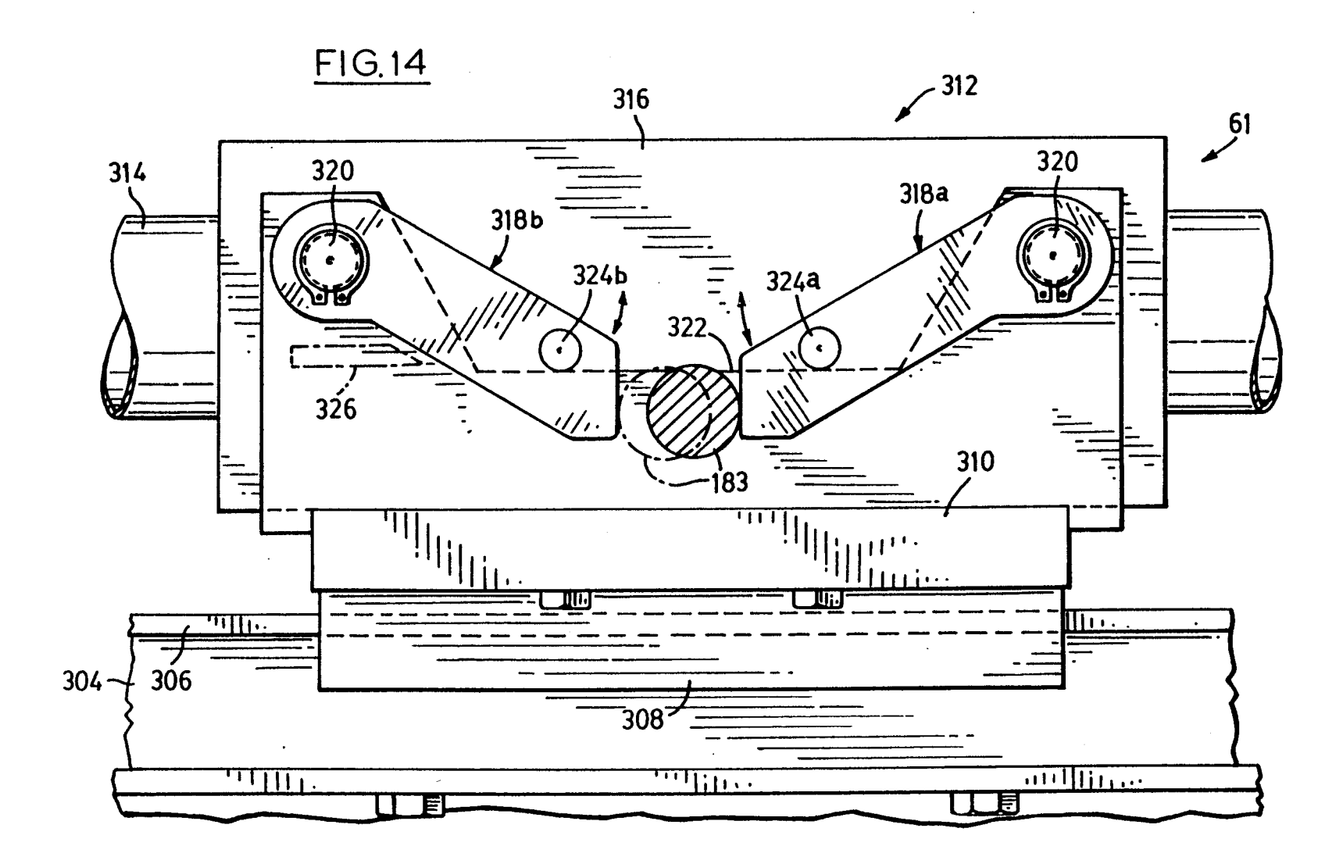
FIG. 14 is a sectional view on line 14—14 of FIG. 13.

The pedestal 310 also carries a support plate 316 which will be more fully supplied with reference to FIG. 14, and in turn, this plate carries two pawls, 318 (one of which can be seen in FIG. 13). Without understanding the mechanism entirely, it will nevertheless be appreciated at this point that when the train impacts the pawls, it will carry the carriage with it and the retardation force will come from the movement of air from the tube 314. Similarly, when the train is brought to a stop, air can be used to drive the train back and bring the piston to the end of its travel where with train is then located properly in the master station.

These features will be more fully appreciated with reference also to FIG. 14. Here it will be seen that the pawls 318 distinguished one from another by the suffices "a" and "b". The pawls are suspended from respective pins 320, attached to the support plate 316 on the pedestal 310. The plate is formed with a shelf 322 on which respective dowels 324 "a" and 324 "b" rest with the pawls in an engagement position, as shown in the drawing.

FIG. 14 shows the mechanism with the rod 183 sitting between the pawls and in engagement with the pawl 318 "a". Consider the actuation of the pawls in the event that the train is travelling from right to left of FIG. 14. As the rod 183 reaches the mechanism 61, it will lift the pawl 318 "a" about its associated pivot 320 and the pawl will then drop back to the position shown. The rod will continue until it engages the pawl 318 "b", and because the line of action is under the associated point of suspension on the pin 320, the pawl will trap the rod. The inertia of the train will then carry the carriage 312 with it resisted by air in the tube 314 which is allowed to escape in a controlled fashion. Once the train comes to a halt, the control system at the master station, under the influence of the PLC, will cause air to enter the tube 314 and push the magnetic cylinder, enhance the carriage 312 along the tube and back to the end of the travel of the piston. All of this of course happens in duplicate because on the other side of the train there is another mechanism as indicated in FIG. 1.

The action of moving the train back will take place with the rod 183 in engagement with the pawl 318 "a" and once the movement is completed, the train is located by the mechanism in the station.

When the train is about to leave, the mechanism is actuated to cause the train to move along the track by entering air into the tube on the opposite side of the piston from that used to drive the train back into the station. Consequently the rod 183 will engage the pawl 318 "b" and the train will accelerate under the influence both of the mechanisms 61 and also the linear induction motor. As the mechanisms complete their task, the carriage 312 will approach the end of the possible travel and a cam 326 (shown in ghost outline) is provided adjacent the end of the travel of the mechanisms to engage the leading pawl 324 "b" and lifted so that the rod 183 can leave the mechanism behind. After the train is gone the mechanism is then actuated to move the carriage 312 back to the other end of the tube 314 ready to receive the next train.

It will be appreciated that although connections are not shown, the master station PLC controls the activity of the mechanism 61.

The invention has been described with reference to a preferred embodiment of train and track but it will be apparent that variations can be made within the scope of the claims.

THE EMBODIMENTS OF THE INVENTION IN WHICH AN EXCLUSIVE PROPERTY OR PRIVILEGE IS CLAIMED ARE DEFINED AS FOLLOWS:

1. Sortation equipment for use in continuous track sortation systems, the equipment comprising: a train adapted to run on a continuous track for moving loads from a master station to one or more slave stations, the train having a locomotive and one or more cars coupled to be driven along the track by the locomotive, each of the cars including a tray tiltable from a load supporting generally horizontal position to a tilted position where the tray is inclined downwardly towards a slave station which is to receive the load off the tray, a discharge mechanism movable from a neutral to an intermediate position and then to an engagement position and including tray support means holding the tray horizontal with the discharge mechanism in the neutral and intermediate positions, and means on the train operable to move the discharge mechanism between the neutral and intermediate positions and the discharge mechanism being movable between the intermediate and engagement positions by contact with fixed means on the track at the slave station to drive the discharge mechanism as the train passes said fixed means whereby, as the discharge mechanism moves towards the engagement position, the tray is tilted to unload and then moved back to horizontal as the discharge mechanism returns to the intermediate position to again support the tray in the horizontal position; whereby when the discharge mechanism is in said neutral position, the discharge mechanism is prevented from engaging said fixed means.

2. Sortation equipment as claimed in claim 1 whereby said track has a generally I-shaped cross-section and including, at the top thereof, upwardly and outwardly extending arms, and at the bottom, downwardly and outwardly extending legs, each of the arms and the legs terminating in running surfaces, and in which the train includes rollers positioned to run on the running surfaces to guide the train on the track.

3. Sortation equipment as claimed in claim 2 in which the track includes a vertical web between the arms and the legs.

4. Sortation equipment as claimed in claim 3 in which the track is an aluminum extrusion.

5. Sortation equipment as claimed in claim 2 and further including a linear induction motor coupled to the track and the locomotive.

6. Sortation equipment as claimed in claim 4 and further comprising a linear induction motor having moving parts attached to the locomotive and fixed parts attached to the track.

7. Sortation equipment as claimed in claim 6 in which the track includes a pair of strips of magnetic material attached one to each of the sides of the web.

8. Sortation equipment as claimed in claim 7 in which said strips are covered by further strips of aluminum.

9. Sortation equipment as claimed in claim 5 and further comprising a power supply including conductors attached to the track, and in which the train includes electrical pick-up means in running contact with the conductors to pick up power for moving the train.

10. Sortation equipment as claimed in claim 1 and further comprising a control mechanism operable to engage with and decelerate the train to a stop and to locate the train at a preferred location on the track.

11. Sortation equipment as claimed in claim 10 in which the control mechanism is also operable to accelerate the train from a standing start.

* * * * *